(12) United States Patent
Kim et al.

(10) Patent No.: US 9,319,412 B2
(45) Date of Patent: Apr. 19, 2016

(54) METHOD FOR ESTABLISHING RESOURCE ACCESS AUTHORIZATION IN M2M COMMUNICATION

(71) Applicant: MODACOM CO., LTD., Seoul (KR)

(72) Inventors: Kyung-su Kim, Yongin-si (KR); Jaeho Lee, Seoul (KR); Yong-jin Kim, Seoul (KR)

(73) Assignee: MODACOM CO., LTD. (KR)

( * ) Notice: Subject to any disclaimer, the term of this patent is extended or adjusted under 35 U.S.C. 154(b) by 0 days.

(21) Appl. No.: 14/403,967

(22) PCT Filed: Nov. 21, 2012

(86) PCT No.: PCT/KR2012/009878
§ 371 (c)(1),
(2) Date: Nov. 25, 2014

(87) PCT Pub. No.: WO2013/180356
PCT Pub. Date: Dec. 5, 2013

(65) Prior Publication Data
US 2015/0143471 A1    May 21, 2015

(30) Foreign Application Priority Data

May 30, 2012 (KR) ........................ 10-2012-0057165

(51) Int. Cl.
*H04L 9/00* (2006.01)
*H04L 29/06* (2006.01)
(Continued)

(52) U.S. Cl.
CPC .............. *H04L 63/10* (2013.01); *H04W 4/005* (2013.01); *H04W 12/06* (2013.01); *H04W 12/08* (2013.01); *H04W 48/02* (2013.01); *H04L 63/0807* (2013.01); *H04L 63/0892* (2013.01)

(58) Field of Classification Search
CPC ....... H04L 63/10; H04W 12/06; H04W 48/02
USPC .............................. 726/2, 3, 4, 6, 9
See application file for complete search history.

(56) References Cited

U.S. PATENT DOCUMENTS 6,460,141 B1 * 10/2002 Olden ................... G06F 21/604
                                                        726/12
7,729,215 B2     6/2010 Suzuki
(Continued)

FOREIGN PATENT DOCUMENTS

KR    20-2010-0011142        2/2010
KR    10-2010-0099625 A      9/2010
(Continued)

OTHER PUBLICATIONS

European Telecommunications Standards Institute, "Machine-to-Machine Communications (M2M); Functional Architecture", ETSI TS 102 690 (Oct. 2011), V1.1.1, pp. 1-180.
(Continued)

*Primary Examiner* — Haresh N Patel
(74) *Attorney, Agent, or Firm* — Harness, Dickey & Pierce, P.L.C.

(57) ABSTRACT

A method for establishing a resource access authorization in M2M communication is provided. When an entity including a terminal, a gateway and an end user as client in a first M2M service provider domain attempts to access resource located in terminal or gateway in second M2M service provider domain, the method includes receiving client credential allocated from M2M Authentication Server (MAS1) in first M2M service provider domain by performing client registration to Network Service Capabilities Layer (NSCL1) in first M2M service provider domain by client, requesting an authorization to access resource to resource owner through NSCL (NSCL2) in second M2M service provider domain based on information about Universal Resource Identifier (URI) of resource by client, verifying client through MAS1 by the resource owner, authorizing client to access the resource by the resource owner, and issuing access token to the client by MAS (MAS2) in second M2M service provider domain.

5 Claims, 8 Drawing Sheets

(51) Int. Cl.
  *H04W 12/06* (2009.01)
  *H04W 48/02* (2009.01)
  *H04W 4/00* (2009.01)
  *H04W 12/08* (2009.01)

(56) References Cited

U.S. PATENT DOCUMENTS

| | | | | |
|---|---|---|---|---|
| 2006/0021004 | A1* | 1/2006 | Moran | H04L 63/08 726/2 |
| 2006/0253420 | A1* | 11/2006 | Hinton | G06F 21/62 707/999.002 |
| 2007/0116250 | A1* | 5/2007 | Stafford | H04L 29/12066 379/355.09 |
| 2008/0025163 | A1 | 1/2008 | Suzuki | |
| 2008/0134305 | A1* | 6/2008 | Hinton | H04L 63/08 726/5 |
| 2008/0279200 | A1* | 11/2008 | Shatzkamer | H04L 63/0892 370/401 |
| 2009/0216854 | A1* | 8/2009 | Ogasawara | H04L 12/2812 709/208 |
| 2010/0031317 | A1* | 2/2010 | Mason | H04L 63/0281 726/3 |
| 2011/0090535 | A1* | 4/2011 | Towata | G06F 3/1203 358/1.15 |
| 2011/0131567 | A1* | 6/2011 | Tirk | G06F 8/60 717/176 |
| 2012/0151028 | A1* | 6/2012 | Lu | H04W 4/18 709/223 |
| 2012/0238247 | A1* | 9/2012 | Wen | H04W 12/08 455/411 |
| 2013/0007858 | A1* | 1/2013 | Shah | H04L 63/0815 726/6 |
| 2013/0139241 | A1* | 5/2013 | Leeder | H04W 12/06 726/9 |
| 2013/0188515 | A1* | 7/2013 | Pinheiro | H04W 4/001 370/254 |
| 2013/0336222 | A1* | 12/2013 | Lu | H04W 72/00 370/328 |
| 2014/0089478 | A1* | 3/2014 | Seed | H04W 4/001 709/222 |
| 2014/0126581 | A1* | 5/2014 | Wang | H04W 4/001 370/431 |
| 2015/0105044 | A1* | 4/2015 | Maguire | H04L 67/16 455/406 |

FOREIGN PATENT DOCUMENTS

KR  10-2010-0113577 A  10/2010
KR  10-2011-0117030 A  10/2011

OTHER PUBLICATIONS

International Search Report for PCT/KR2012/009878 (in English and Korean), mailed Mar. 28, 2013; ISA/KR.
International Search Report for PCT/KR2012/009879 (in English and Korean), mailed Mar. 28, 2013; ISA/KR.

* cited by examiner

METHOD FOR ESTABLISHING RESOURCE ACCESS AUTHORIZATION IN M2M COMMUNICATION

TECHNICAL FIELD

The present disclosure in one or more embodiments relates to a method for authorizing access to resource in Machine-to-Machine (M2M) communications. More particularly, the present disclosure relates to a method for, when an entity attempts to access resource located in another entity (Device/Gateway), establishing an authorization of the entity to access to the resource in M2M communications.

BACKGROUND

The statements in this section merely provide background information related to the present disclosure and do not constitute prior art.

In general, M2M communication enables various machines equipped with a wireless communication module to implement various communication services with no or minimal human intervention. With M2M communication, communication services shift from existing human-to-human communication to device-to device communication. The M2M communication technology is extended to solutions to collect information about various devices, process the collected information into useful information, and provide the useful information in a customized manner by combining communication technology with Information Technology (IT), beyond a communication function focusing on simple data transmission between a human being and a device or between devices.

An M2M standard under way represents information data managed by an M2M device or an M2M gateway, and an M2M server as resource data. In an M2M service structure viewed from the perspective of data information processing, an M2M device and an M2M gateway transmit their collected data to an M2M server. A Network Application (NA) of an M2M service provider accesses resource data of the M2M server and searches for information according to a policy of the M2M service provider without any particular access granting procedure from an owner of the resource data. The M2M standardization is now in its initial stage, not specifying a method for establishing an authorization to access resource data. Thus, efforts are expended on development of a method for establishing an authorization to access resource data.

DISCLOSURE

Technical Problem

Therefore, the present disclosure has been made in an effort to effectively provide a method for authorizing access to resource so that an entity may share its resource data with another entity in various Machine-to-Machine (M2M) communication environments.

SUMMARY

In accordance with some embodiments of the present disclosure, a method for establishing an authorization to access resource in Machine-to-Machine (M2M) communication, when an entity selected from a terminal, a gateway and an end user as a client in a first M2M service provider domain attempts to access resource located in a Network Service Capabilities Layer (NSCL2) in a second M2M service provider domain, the method comprising: receiving by the client a client credential allocated from an M2M Authentication Server (MAS1) in the first M2M service provider domain by performing a client registration to an NSCL1 in the first M2M service provider domain; requesting by the client an authorization to access the resource to a resource owner of the resource based on information about a Universal Resource Identifier (URI) of the resource; verifying, by the resource owner, the client through the MAS1; granting a MAS2 in the second M2M service provider domain, by the resource owner, the authorization for the client to access the resource; and issuing, by the MAS2, an access token to the client.

In another aspect of the present disclosure, method for accessing resource located in a Network Service Capabilities Layer (NSCL2) in a second Machine-to-Machine (M2M) service provider domain by an entity selected from a terminal, a gateway and an end user as a client in a first M2M service provider domain, the method comprising: receiving a client credential allocated from an M2M Authentication Server (MAS1) in the first M2M service provider domain by performing a client registration to a Network Service Capabilities Layer (NSCL1) in the first M2M service provider domain; requesting an authorization to access the resource to a resource owner of the resource based on information about a Universal Resource Identifier (URI) of the resource; receiving an access token issued from a MAS (MAS2) in the second M2M service provider domain; and accessing the resource based on the issued access token.

In yet another aspect of the present disclosure, a method for establishing an authorization of a client to access a protected resource located in a Network Service Capabilities Layer (NSCL1) in a first Machine-to-Machine (M2M) service provider domain by a resource owner of the resource, the client being one of a terminal, a gateway, and an end user in a second M2M service provider domain, the method comprising: receiving an authorization request for the client; verifying the client through an M2M Authentication Server (MAS2) in the second M2M service provider domain; and authorizing the client to the NSCL1 and an M2M Authentication Server (MAS1) in the first M2M service provider domain.

In yet another aspect of the present disclosure, a method for establishing an authorization to access resource, when an entity as a client belonging to no Machine-to-Machine (M2M) service provider domain attempts to resource located in a Network Service Capabilities Layer (NSCL) in an M2M service provider domain, the method comprising: receiving by the client a client credential allocated from an M2M Authentication Server (MAS) in the M2M service provider domain by performing a client registration to a Network Service Capabilities Layer (NSCL) in the M2M service provider domain; requesting, by the client, an authorization to access the resource to a resource owner of the resource based on information about a Resource_URI of the resource; verifying by the resource owner the client through the MAS in the M2M service provider domain; authorizing by the resource owner the client to access the resource; and issuing an access token to the client by the MAS.

In yet another aspect of the present disclosure, a method for accessing resource located in a Network Service Capabilities Layer (NSCL) in an M2M service provider domain by an entity as a client belonging to no Machine-to-Machine (M2M) service provider domain, the method comprising: receiving a client credential allocated from an M2M Authentication Server (MAS) in the M2M service provider domain by performing a client registration to the NSCL in the M2M service provider domain; requesting an authorization to access the resource to a resource owner of the resource based on information about a Universal Resource Identifier (URI) of the resource; receiving an access token issued from the MAS; and accessing the resource based on the issued access token.

In yet another aspect of the present disclosure, a method for establishing an authorization of an entity as a client to access resource located in a Network Service Capabilities Layer (NSCL) in a Machine-to-Machine (M2M) service provider domain by a resource owner of the resource, the client belonging to no M2M service provider domain, the method comprising: receiving an authorization request for the client; verifying the client through an M2M Authentication Server (MAS) in the M2M service provider domain; and authorizing the client to access the resource to and the MAS.

In yet another aspect of the present disclosure, a method for establishing an authorization to access resource in Machine-to-Machine (M2M) communication, when entity selected from a terminal, a gateway and an end user as a client in an M2M service provider domain attempts to access resource located in a Network Service Capabilities Layer (NSCL) in the same M2M service provider domain, the method comprising: receiving by the client a client credential allocated from an M2M Authentication Server (MAS) in the M2M service provider domain by performing a client registration to the NSCL in the M2M service provider domain by the client; requesting by the client an authorization to access the resource to a resource owner of the resource based on information about a Resource_URI of the resource; verifying by the resource owner the client through the MAS in the M2M service provider domain; granting the MAS the authorization for the client to access the resource by the resource owner; and issuing an access token to the client by the MAS in the M2M service provider domain.

In yet another aspect of the present disclosure, a method for accessing resource located in a Network Service Capabilities Layer (NSCL) in a Machine-to-Machine (M2M) service provider domain by an entity as a entity selected from a terminal, a gateway and an end user as a client in the same M2M service provider domain, the method comprising: receiving a client credential allocated from an M2M Authentication Server (MAS) in the M2M service provider domain by performing a client registration to a Network Service Capabilities Layer (NSCL) in the M2M service provider domain; requesting an authorization to access the resource to a resource owner of the resource based on information about a Universal Resource Identifier (URI) of the resource; receiving an access token issued from the MAS in the M2M service provider domain; and accessing the resource based on the issued access token.

In addition, according to yet another aspect of the present disclosure, a method for establishing an authorization of a client to access resource located in a Network Service Capabilities Layer (NSCL) in a Machine-to-Machine (M2M) service provider domain by a resource owner of the resource, the client being one of a terminal, a gateway, and an end user in the M2M service provider domain, the method comprising: receiving an authorization request for the client; verifying the client through an M2M Authentication Server (MAS) in the M2M service provider domain; and authorizing the client to the MAS.

In yet another aspect of the present disclosure, a method for authorizing access of a client to a resource by a Network Service Capabilities Layer (NSCL) having the resource in Machine-to-Machine (M2M) communication, the method comprising: receiving an authorization request from the client; forwarding the authorization request to a resource owner of the resource; receiving an access authorization request for the client from the resource owner; establishing an authorization of the client to access the resource; receiving an access token issued with respect to the resource from a server providing an Authentication, Authorization, and Accounting (AAA) service; and determining whether to authorize the client to access the resource according to whether the access token issued from the server providing the AAA service is identical to an access token presented by the client.

Advantageous Effects

According to the present disclosure as described above, since an entity attempting to access resource located in a domain of an M2M service provider gets an access token issued from an M2M Authentication Server (MAS) as an authentication key for temporary access to the resource and uses the access token, information can be shared between a plurality of entities, access of an unauthorized entity to information of another entity can be prevented, and a security threat that may occur to resource data shared between entities can be prevented.

DETAILED DESCRIPTION

Figure 1:
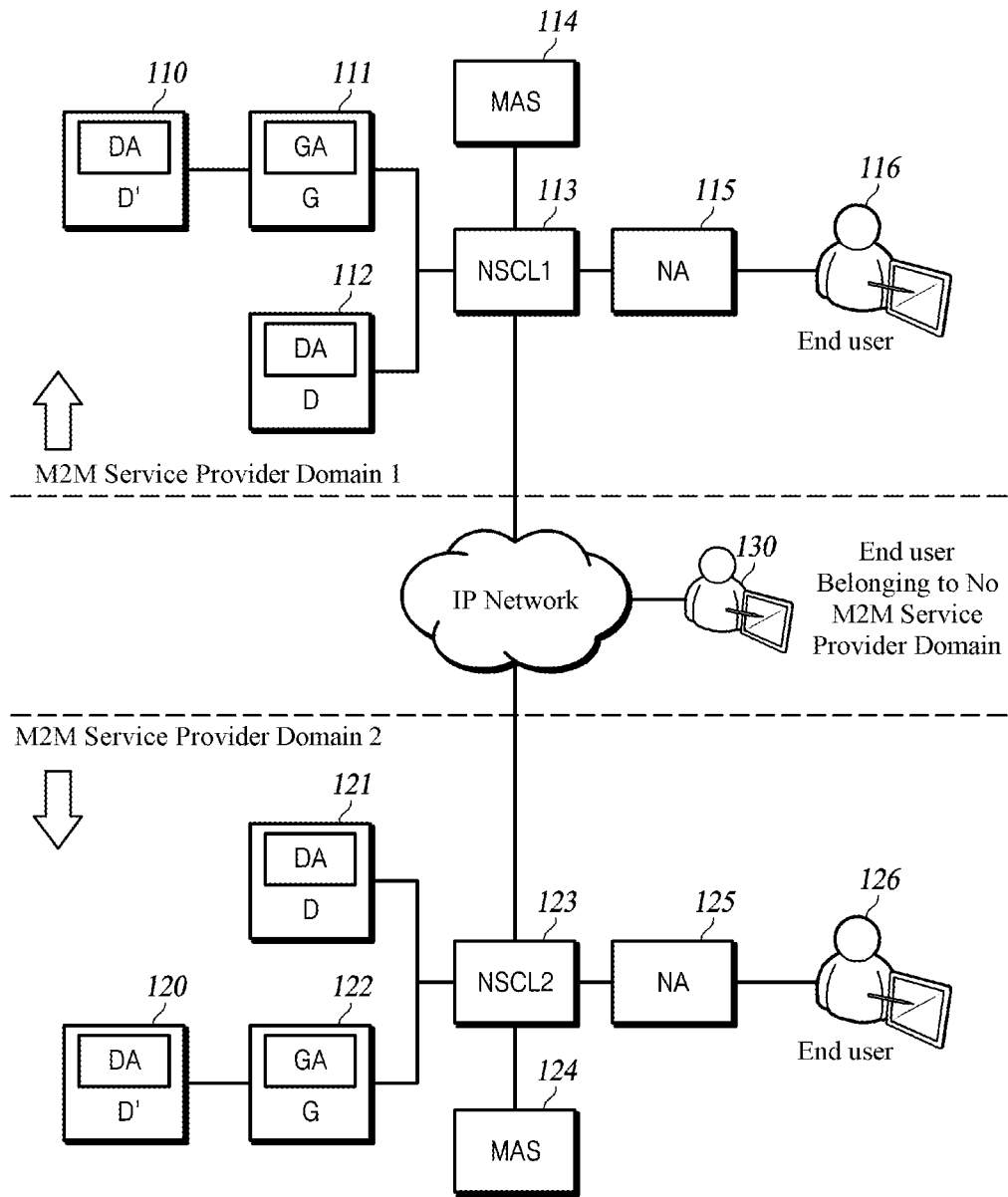
FIG. 1 is a schematic block diagram showing a relationship between Machine-to-Machine (M2M) service entities.

Hereinafter, a method for establishing an authorization to access resource in Machine-to-Machine (M2M) communication according to at least one embodiment of the present disclosure will be described in detail. The drawings will leave out untold particulars for the purpose of clarity and for brevity. In the following description, like reference numerals designate like elements, although the elements are shown in different drawings.

In addition, one of ordinary skill would understand terms like 'include', 'comprise', and 'have' to be interpreted in default as inclusive or open rather than exclusive or closed unless expressly defined to the contrary. All the terms that are technical, scientific or otherwise agree with the meanings as understood by a person skilled in the art unless defined to the contrary. One of ordinary skill would understand common terms as found in dictionaries are interpreted in the context of the related technical writings not too ideally or impractically unless the present disclosure expressly defines them so. A term 'client' refers to an entity attempting to access resource carrying information collected or generated by another M2M device, another M2M gateway, or another M2M application. The client may be an M2M device, an M2M gateway, or an M2M application that is located in an M2M service provider domain, or an end user or a third-party application that does not belong to any M2M service provider domain. A term used hereinbelow, 'resource owner' refers to an entity that may grant or reject an authorization to access resource to a client attempting to access the resource. The resource owner may be an M2M device, an M2M gateway, or an M2M application. A term 'resource' refers to a bucket containing information collected or generated by an M2M application. The resource is accessed using a Universal Resource Identifier (URI), Resource_URI. A term 'D/G' refers to an M2M Device (D) and an M2M Gateway (G). Unless otherwise specified, terms or abbreviations described in the specification should be interpreted in conformance to M2M technical specifications of the M2M communication field and the European Telecommunications Standards Institute (ETSI). For example, NSCL represents an M2M Service Capability Layer in a network domain. In addition, an M2M application is an application that executes a service logic and uses service capabilities accessible through an open interface. M2M applications include Network Application (NA), Gateway Application (GA), and Device Application (DA). An NA refers to an application that executes a service logic and is located in a network and application program domain, using service capabilities accessible through an open interface. A GA refers to an application that executes a service logic and is located in an M2M gateway, using service capabilities accessible through an open interface. A DA refers to an application that executes a service logic and is located in an M2M device, using service capabilities accessible through an open interface. While an M2M Authentication Server (MAS) defined in an ETSI M2M standard is described throughout the specification as a server that verifies a client, generates an authorization code, and issues an access token, a general Authentication, Authorization, and Accounting (AAA) server or a server providing an AAA service in a third M2M service provider domain may serve as the MAS.

With reference to the attached drawings, a method for establishing an authorization to access resource in M2M communication according to the present disclosure will be described in detail.

FIG. 1 is a diagram schematically showing a relationship between M2M service entities.

FIG. 1 is based on the assumption that there are various M2M service providers providing different services in M2M communication. Referring to FIG. 1, there are NAs 115 and 125, first and second NSCLs (NSCL1 and NSCL2) 113 and 123, MASs 114 and 124, and M2M gateways 111 and 122 each including a GA, M2M devices 110, 112, 120, and 121 each including a DA, and end-user devices 116 and 126 in first and second M2M service provider domains (M2M service provider domain 1 and M2M service provider domain 2). Some M2M devices 112 and 121 may access a network domain directly and other M2M devices 110 and 120 may access the network domain through one or more gateways serving as proxies of the network domain. An end-user device 130 may access an M2M service provider domain through the Internet from the outside, without subscribing to any M2M service provider.

While resource may be located in Service Capabilities Layers (SCLs) of the M2M devices 110, 112, 120, and 1212 and the M2M gateways 111 and 122 as well as the NSCLs 113 and 123, the following description is given of a method for establishing an authorization to access resource according to an embodiment of the present disclosure, with the appreciation that resource is located in the NSCL. A resource owner may be any of a device, a gateway, and an NA and a client may be any of a device, a gateway, an NA, and an end user.

To implement a method for acquiring an authorization to access protected resource data in an M2M service provider domain by a client, the three cases may be considered depending on whether the client and a resource owner belong to the same or different M2M service provider domains. One of the three cases is that the resource owner and the client belong to different M2M service provider domains. Such an example is convergence between vertical service domains that provide specialized services of specific business types. For example, an optimized environment may be built for a patient by exchanging information between an e_Health terminal and a home network or between home energy devices. In this case, direct communication between devices is more efficient than information exchange between the devices through a server. For direct communication, there may be a need for an operation for preliminarily establishing an authorization to access data of the other device between devices included in each M2M service provider domain. Another case is that the client is located outside an M2M service provider domain. For example, when a portable phone attempts to search for weather information such as an ambient weather and temperature of an office by direct communication with a weather measurer related to a weather information service or when a portable phone attempts to search for Global Positioning System (GPS) data by direct communication with a Digital Tachograph (DTG) of a bus, an operation for acquiring an authorization to search for the data may be needed. The other case is that the client and the resource owner belong to the same M2M service provider domain. For example, when data communication is conducted between vehicles by Car_to_Car communication or state information data of patients are exchanged between e_Health terminals, even access of a device subscribing to the same M2M service to data of another device may cause a problem and thus an operation for acquiring an authorization to access data may be needed.

Figure 2:
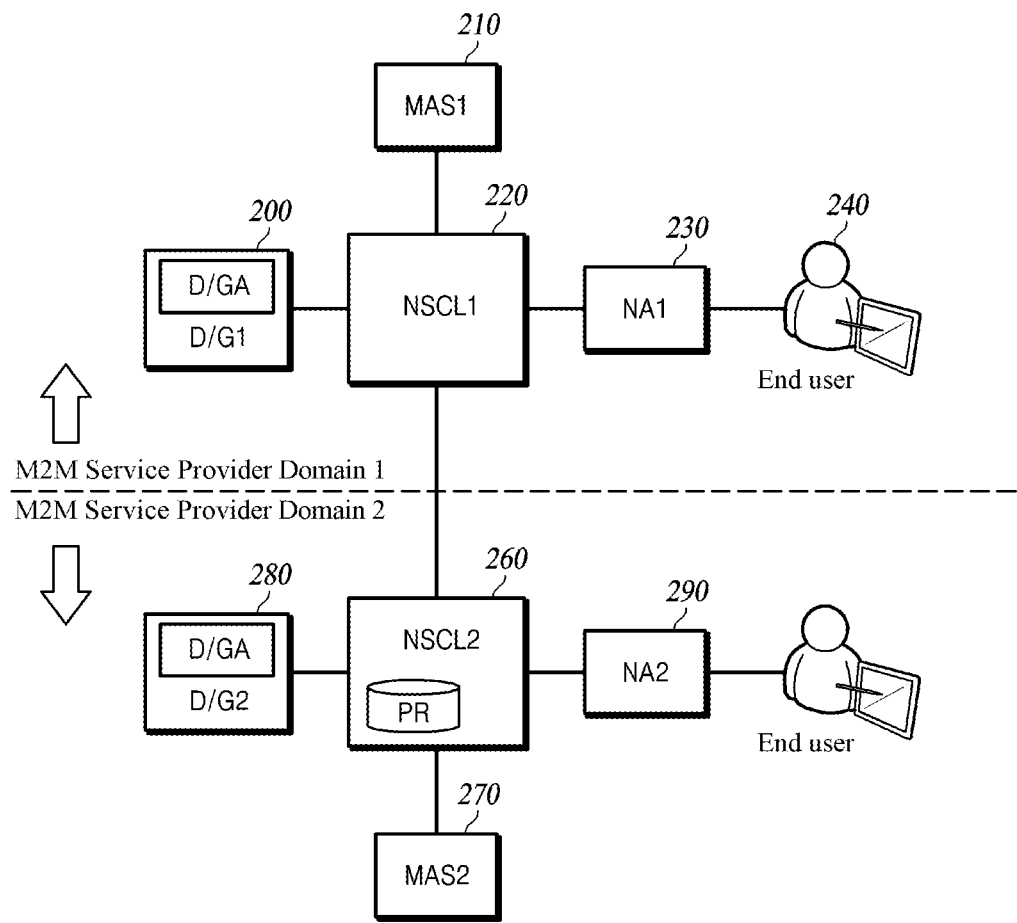
FIG. 2 is a schematic block diagram showing a relationship between M2M devices, when a client and a resource owner are located in different M2M service provider domains.
Figure 3:
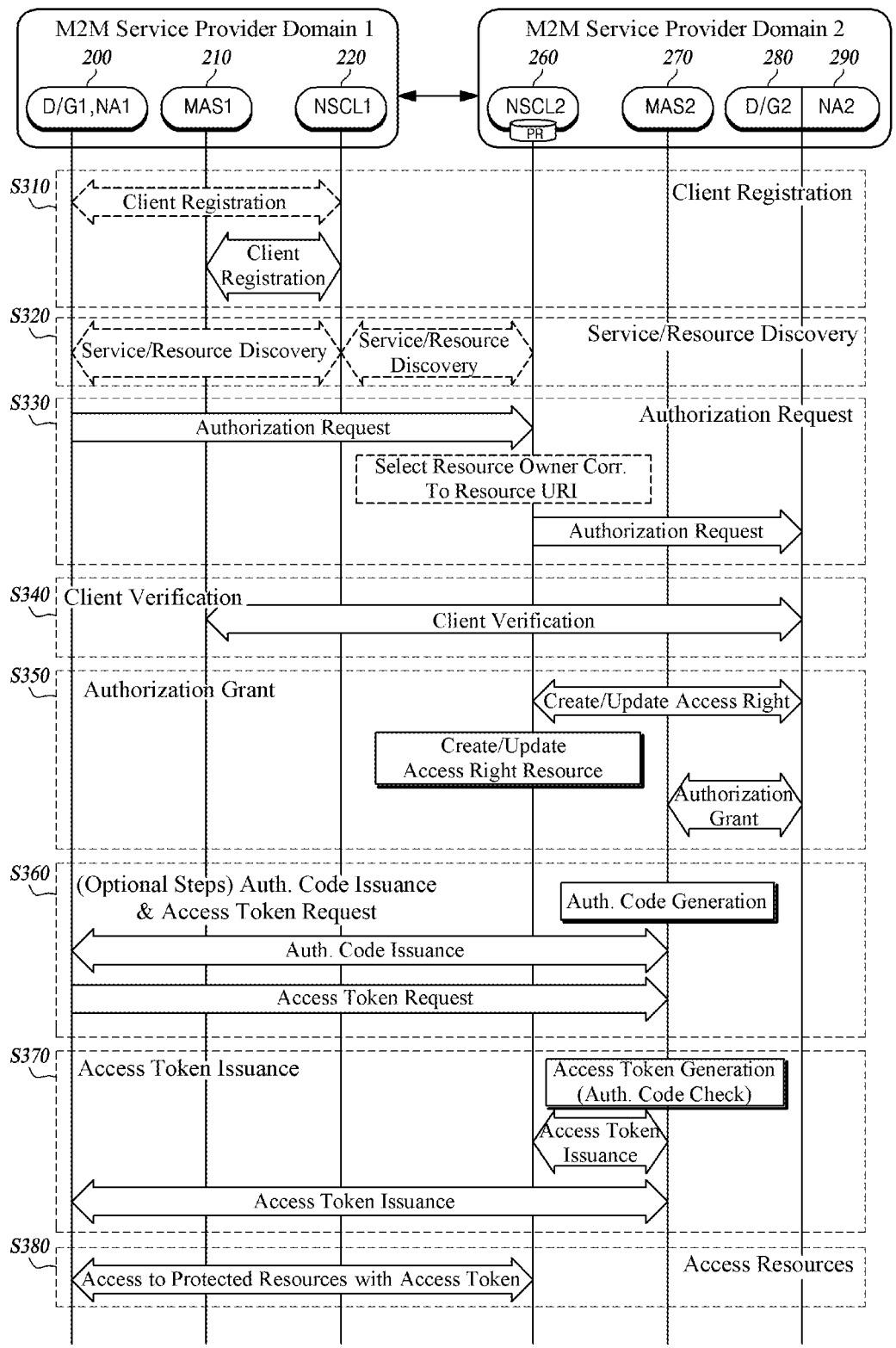
FIG. 3 is a flowchart of an operation for establishing an authorization to access resource, when a client and a resource owner are located in different M2M service provider domains according to an embodiment of the present disclosure.

With reference to FIGS. 2 and 3, a method for authorizing resource access according to an embodiment of the present disclosure in the case where a client and a resource owner belong to different M2M service provider domains will be described below.

FIG. 2 is a schematic block diagram showing a relationship between M2M service entities, when a client and a resource owner are located in different M2M service provider domains.

FIG. 2 is based on the assumption that a first D/G (D/G1) 200, a first NA (NA1) 230, or an end user 240 belonging to M2M service provider domain 1 attempts to access a resource located in an NSCL2 260 of M2M service provider domain 2.

An entity responsible for determining whether to grant or reject access of D/G1 200 to the resource located in D/G2 280 and determining an access scope for D/G1 200 may be D/G2 280 that has generated or collected information carried in the resource, or a second NA (NA2) 290 of a relevant M2M server. Accordingly, a client is D/G1 200, NA1 230, or the end user 240 in M2M service provider domain 1, and a resource owner is NA2 290 in M2M service provider domain 2.

While MASs 210 and 270 are shown in FIG. 2 as separately configured in different M2M service provider domains as described before, a server providing an AAA service in a third M2M service provider domain may substitute for the MASs 210 and 270, in terms of functionality.

FIG. 3 is a flowchart of an operation for establishing an authorization to access resource, when a client and a resource owner are located in different M2M service provider domains according to an embodiment of the present disclosure.

While a mechanism of establishing an authorization to access resource according to an embodiment of the present disclosure is illustrated in FIG. 3 in the case where a client is D/G1, it should be understood that the same mechanism is applicable when the client is NA1 230 or the end user 240.

STEP 00 is pre-procedures conforming to the ETSI M2M standard. In the pre-procedures, the client completes an M2M service bootstrap procedure, an M2M service connection procedure, and an SCL registration procedure. In addition, a relationship between D/G1 200 and a D/GSCL may be based on the premise that D/G1 200 performs a procedure for registering a DA and a first GA (GA1).

STEP 01 is a client registration step S310. D/G1 200 is allocated client credentials (Client_ID and Client_Secret) by performing a client registration procedure on NSCL1 220. Specifically, upon receipt of a client registration message from D/G1 200, NSCL1 220 transmits a client registration message to MAS1 210. Upon receipt of the client registration message from NSCL1 220, MAS1 210 generates Client_ID and Client_Secret for D/G1 200 and allocates Client_ID and Client_Secret to D/G1 200 through NSCL1 220. Although Client_ID and Client_Secret are not limited to any specific generation method, MAS1 210 may allocate, as Client_ID, one of Identifiers (IDs) defined in the ETSI M2M standard, such as App_ID, Node_ID, Service Connection_ID, and SCUD of a client, or a value generated by combining the one ID with one or more of an application Key, a root Key, and a connection key. Client_Secret may be generated in various manners using at least one of the IDs and the keys.

STEP 02 is a service/resource discovery step S320. For the client to initiate an authorization procedure, a procedure for providing a service requested by the client or discovering a resource owner having resource information is needed. The client acquires information (ID or URI) about the resource owner and determines the location of a resource server (NSCL) in which the resource are located by the service/resource discovery step. For this purpose, in one embodiment, the client acquires information about the location (ID or URI) of the resource owner and the location of the resource server (NSCL) resource through NSCL2 260 belong to the M2M service domain where the resource is located. For example, the service/resource discovery step S320 may include transmitting a discovery message including discovery filter criteria such as the type of desired information to NSCL1 220 by D/G1 200, transmitting the discovery message to NCSL2 260 having discovery resource by NCSL1 220, and searching for a Resource_URI list matching the discovery filter criterion and transmitting a search result to D/G1 200 by NSCL2 260. In the service/resource discovery step S320, D/G2 280 or the NA2 290, which is the resource owner, may indicate at least one of its URI and Resource_URI to D/G1 200 which is the client. If the client has prior knowledge of the resource owner or the Resource_URI or the locations of the resource owner and the resource are preset, the above service/resource discovery step S320 may be omitted. In other words, the client may acquire the Resource_URI information before an authorization request step S330. The Resource_URI information may be acquired in the service/resource discovery step S320 or received in advance from the resource owner according to a service provider's setting or policy or in any other procedure.

STEP 03 is the authorization request step S330. In the authorization request step S330, the client requests an authorization to the resource owner. D/G1 200 transmits an authorization request message to NSCL2 260 through NSCL1 220. The authorization request message may include at least one of parameters such as authorization_type, resource_uri, client_id, client_secret, access_scope, callback_uri, and state. Authorization_type indicates an authorization type, client_id and client_secret are client credentials, resource_uri provides information about the location of resource, and state indicates a random value transmitted or received by a client or an authorization server in an authorization step. Access_scope specifies a requested access scope. In other words, access_scope indicates an authorization scope such as Create/Retrieve/Update/Delete or information requiring an access authorization. NCSL2 260 determines a resource owner corresponding to the Resource_URI at an SCL or application resource level. A container resource indicating a container for an instance object and a location container including information about the location of a remote object may include information about the URI of a resource owner, as an attribute. In this case, NSCL2 260 may acquire, from the attribute of the container resource or the location container resource, information about a resource owner having protected resource which the client attempts to access. NSCL2 260 transmits an authorization request message to a detected resource owner.

STEP 04 is a client verification step S340. The resource owner verifies the client in regard to the authorization request message. To verify the client, the resource owner may request client verification to MAS1 210, an end user connected to the resource owner may verify the client, or the resource owner may request client verification to an M2M service provider (NSCL2/NA2 260/290) and the M2M service provider may verify the client according to an access authorization policy of the M2M service provider. For example, the method for requesting client verification to MAS1 210 may include requesting verification of the client to MAS1 210 to which D/G1 200 has been registered by the resource owner, determining whether D/G1 200 has been normally registered to MAS1 210 based on client credentials by MAS1 210, and transmitting a client verification response message to the resource owner based on the determination result by MAS1 210. The verification request message may include parameters such as the client credentials (Client_ID and Client_Secret) and the client verification response message may include the client credentials and certificates.

STEP 05 is an authorization grant step S350. Upon successful completion of the client authentication, the resource owner requests to set up access right for the client D/G1 200 resource so that the client D/G1 can access to the protected resource. The request message includes at least one of parameters including client_id, client_secret, access_scope, and resource_location. Client_id and client_secret are parameters related to client credentials, access_scope is a parameter related to an access scope which the resource owner wishes to allow to the client, and resource_location is a parameter indicating a location at which resource is stored. For example, the resource_location parameter may include Resource_URI information. NSCL2 260 generates an access right resource associated with the protected resource in response to the request of the resource owner. Alternatively, if the access right resource associated with the protected resource already exists, D/G2 280 updates the attribute of the access right resource. The access right resource is a resource in which information used to control access to the protected resource is stored, that is, information indicating an entity allowed to access the protected resource and what the allowed entity is allowed to do with the protected resource. The resource owner transmits an access authorization grant message to authorization server MAS2 270 through NSCL2 260 to inform the MAS2 270 that authorization for D/G1 200 has been granted. Meanwhile, the access authorization grant message may include Client_ID and information about the location of the resource (for example, information indicating whether the resource is stored in the NSCL or DA or other resource owner).

STEP 06 is an authorization code issuance and access token request step S360, which is an optional step. MAS2 270 generates an authorization code and issues the authorization code to D/G1 200, as evidence that the authorization request of D/G1 200 has been granted. D/G1 200 requests to issue an access token required to access to information contained in the protected resource to MAS2 270 through NSCL1 220 and NSCL2 260, with presenting the authorization code. The access token issue request message may include at least one of parameters including authorization_type, code, callback_uri, client_id, and client_secret. Authorization_type indicates an authorization type, code indicates an authorization code, callback_uri indicates the ID or URI of the client requesting authorization, and client_id and client_secret provide client credential information.

STEP 07 is an access token issuance step S370. MAS2 270 validates the authorization code presented by D/G2 280. If the authorization code is valid, MAS2 270 generates an access token, delivers the access token to NSCL2 260 so as to associate the access right resource with the access token, and issues the generated access token to D/G1 200, along with an allowed access scope. In an embodiment, NSCL2 260 may transmit the received access token along with the allowed access scope to D/G1 200, on behalf of MAS2 270. If STEP 06 is omitted, MAS2 270 generates the access token upon receiving the access authorization message from the resource owner in STEP 05, without checking the authorization code. D/G2 280 manages the received access token by mapping the access token to the access right resource. MAS2 270 may issue a refresh token along with the access token in order to update the access token. A message including the issued access token may include one or more of parameters including token_type, expiration_time, access_scope, state, client_id, client_secret, and resource_location. Token_type is a parameter indicating how the token value has been generated, for example, a coding scheme in which the token value has been generated. Expiration_time is a parameter indicating an expiration time of access_token, access_scope is a parameter indicating an allowed access right scope such as Create/Retrieve/Update/Delete or the scope of individual resource that are accessible. State is a parameter indicating a random value used in message exchange between a client and an authorization server and client_id and client_secret are parameters providing client credential information. Resource_location is a parameter indicating whether the resource is stored in an NSCL or a resource owner (ex. DA).

STEP 08 is an access to protected resource step S380. D/G1 200 presents the access token to D/G2 280 in order to access to the protected resource located in NSCL2 260. NSCL2 260 validates the access token received from D/G1 200 by comparing with the access token issued from MAS2 270, checks the access right resource, and allows D/G1 200 to access to the protected resource within the authorization scope matching the access token.

Figure 4:
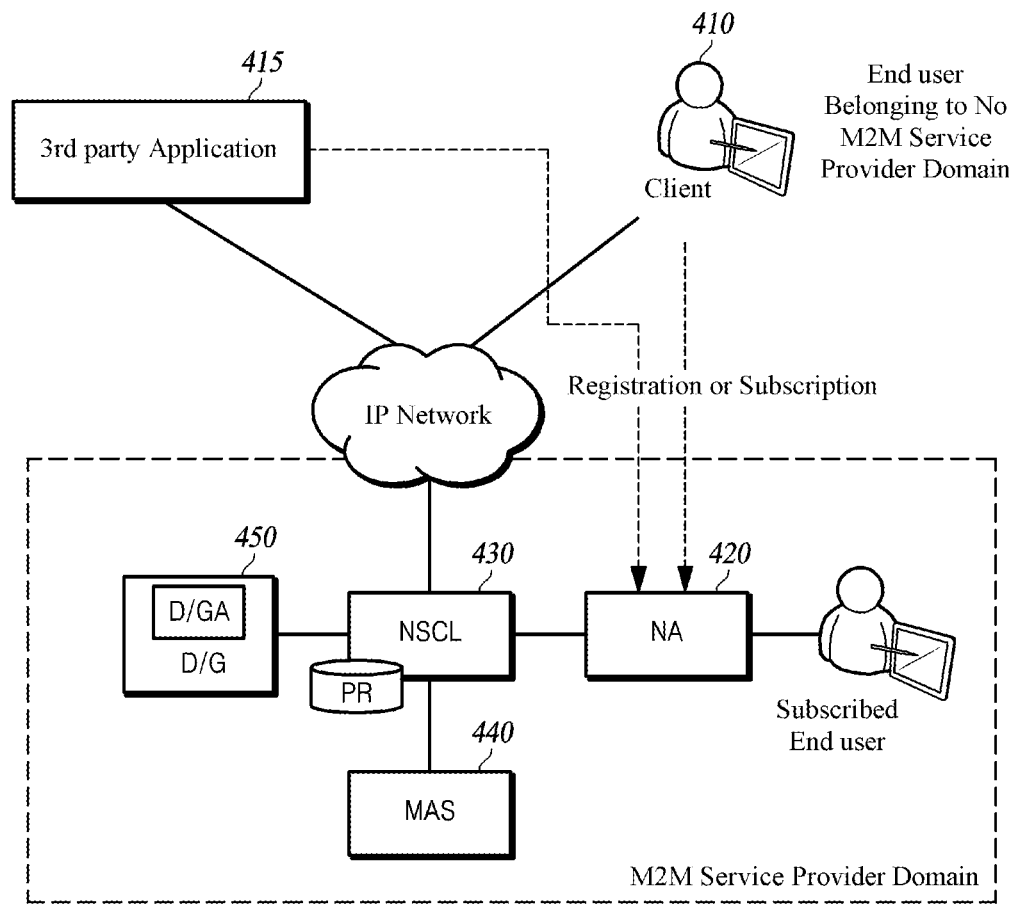
FIG. 4 is a schematic block diagram showing a relationship between M2M service entities, when a client has not subscribed to an M2M service.

FIG. 4 is a schematic block diagram showing a relationship between M2M service entities, when a client has not subscribed to an M2M service.

FIG. 4 is based on the assumption that an end user 410 belonging to no M2M service provider domain or a third-party application 415 attempts to access resource located in an SCL of a DSNL 430 in an M2M service provider domain.

In this case, the end user 410 and the third-party application 415 are clients. After the end user 410 or the third-party application 415 registers or subscribes to an NA 420, the end user 410 or the third-party application 415 needs to be configured so as to acquire an authorization to selectively access only necessary resource during the M2M service.

In the following, FIGS. 5 and 6 will be referenced to describe a method for establishing an authorization to access resource in the M2M service provider domain, when a client has no subscription to an M2M service. While a mechanism of establishing an authorization to access resource in the case where a client is an application of the end user 410 according to an embodiment of the present disclosure is illustrated in FIGS. 5 and 6, it should be understood that the same mechanism is applicable when the client is the third-party application.

Figure 5:
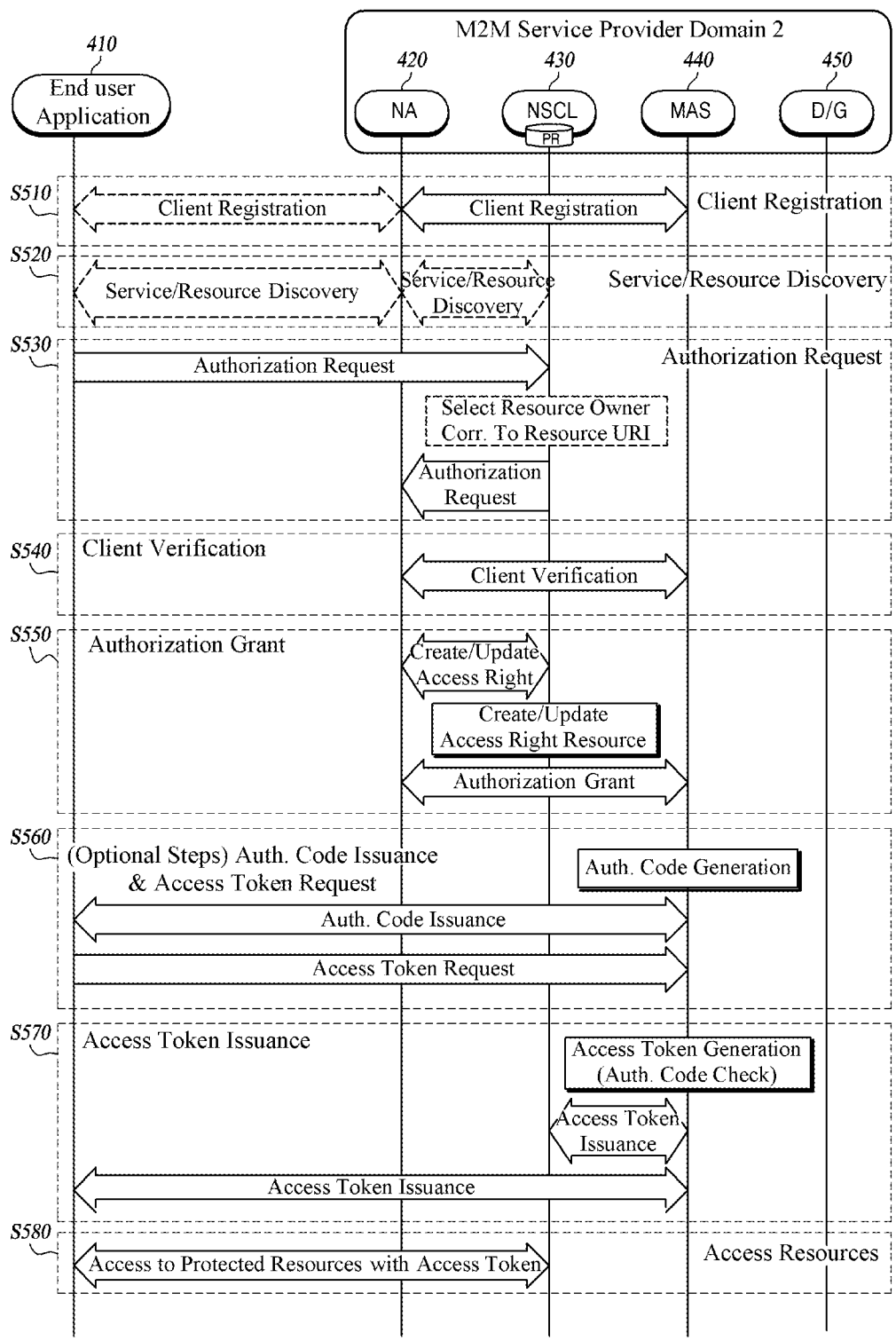
FIG. 5 is a flowchart of an operation for establishing an authorization to access resource, when a client requests a resource owner NA for an access authorization request.
Figure 6:
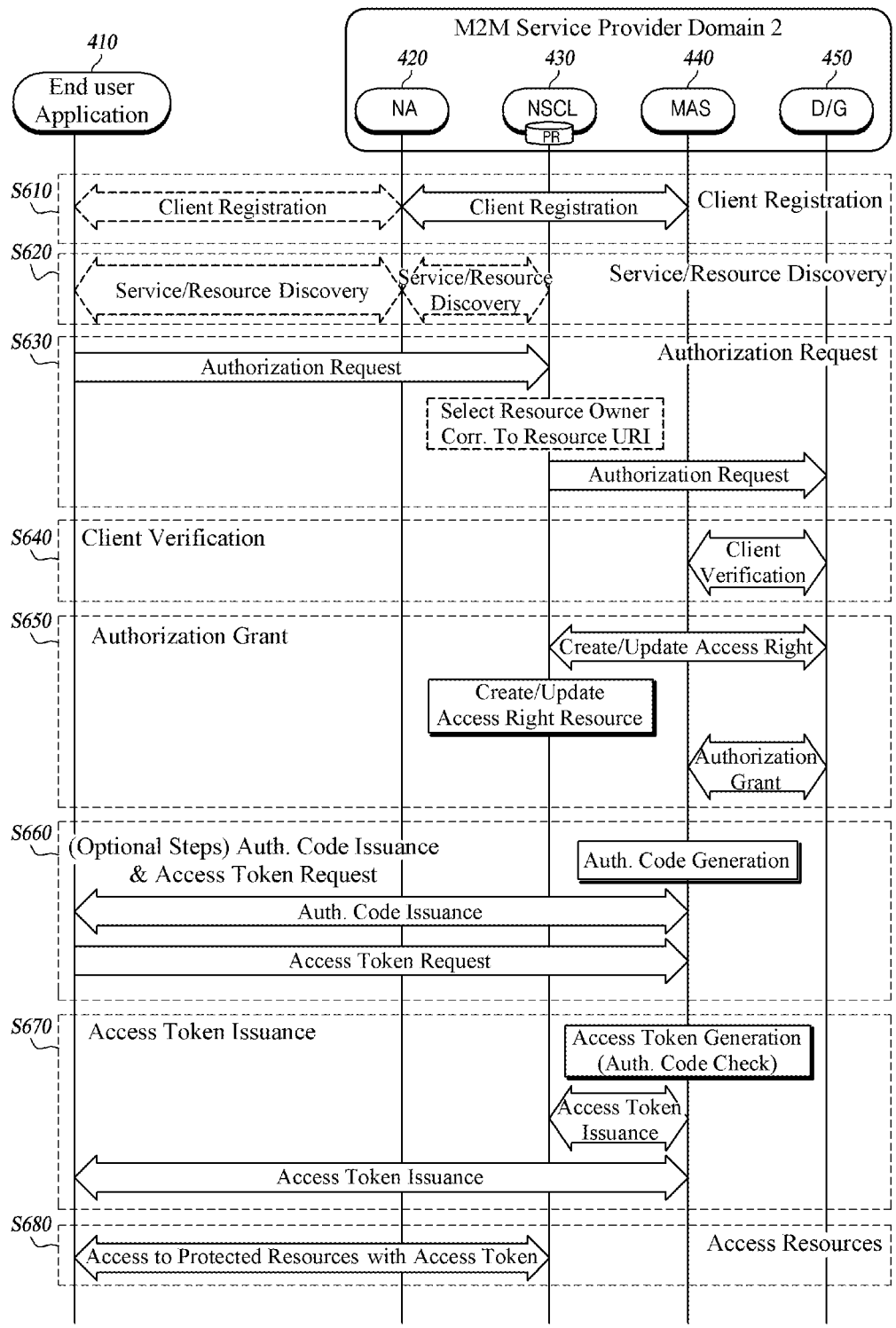
FIG. 6 is a flowchart of an operation for establishing an authorization to access resource, when a client requests a resource owner D/G2 for an access authorization request.

FIG. 5 is a flowchart of an operation for establishing an authorization to access resource, when a client requests the resource owner NA for granting the access authorization according to an embodiment of the present disclosure.

In regard to a relationship between entities illustrated in FIG. 5, as the End-User Application (EUA) 410 has not subscribed to an M2M service provider domain, the EUA 410 is independent of the M2M service provider domain. The EUA 410 is a client and the NA 420 is a resource owner. The D/G 450 is not particularly involved in the operation for establishing an authorization to access resource.

Step 00 is pre-procedures conforming to the ETSI M2M standard. In the pre-procedures, the client completes an M2M service bootstrap procedure, an M2M service connection procedure and an SCL registration procedure.

STEP 01 is a client registration step S510. The EUA 410 is allocated client credentials (Client_ID and Client_Secret) by performing a client registration procedure. Upon receipt of a client registration message from the EUA 510, the NA 420 transmits a client registration message to a MAS 440. Upon receipt of the client registration message, the MAS 440 generates Client_ID and Client_Secret for the EUA 410 and allocates Client_ID and Client_Secret to the EUA 510 through the NA 420. Since Client_ID and Client_Secret are generated in the same manner as in STEP 01 of FIG. 3, a description of the generation of Client_ID and Client_Secret will not be provided herein.

STEP 02 is a service/resource discovery step S320. For the client to initiate an authorization procedure, a procedure for providing a service requested by the client or discovering a resource owner having resource information is needed. The client acquires information (ID or URI) about the resource owner and determines the location of a resource server in which the resource is located by the service/resource discovery step. For this purpose, in one embodiment, the client acquires information about the location (ID or URI) of the resource owner and the location of the resource server resource through the NSCL 430 belong to the M2M service domain where the protected resource is located. For example, the service/resource discovery step S520 may include transmitting a discovery message including discovery filter criteria such as the type of desired information to the NA 420 by the EUA 410, transmitting a discovery message to the NCSL 430 having discovery resource by the NA 420, and searching for a Resource_URI list matching the discovery filter criterion using the discovery resource and transmitting a search result to the EUA 410 by the NSCL 430. In the service/resource discovery step S520, the D/G 450 that has collected or generated information stored in the resource or the NA 420 being the resource owner may indicate at least one of its URI and Resource_URI to the EUA 410 being the client. If the client has prior knowledge of the resource owner or Resource_URI or if the locations of the resource owner and the resource are preset, the above service/resource discovery step S520 may be omitted. That is, the client may acquire the Resource_URI information before an authorization request step S530. The Resource_URI information may be acquired in the service/ resource discovery step S520 or received in advance from the resource owner according to a service provider's setting or policy or in any other procedure.

STEP 03 is the authorization request step S530. In step S530, the EUA 410 requests an authorization to the NSCL 430. The NSCL 430 detects a resource owner corresponding to Resource_URI at an SCL or application resource level. As described before with reference to FIG. 3, the NSCL 430 may acquire, from an attribute of a container resource or a location container resource, information about a resource owner having protected resource which the client attempts to access. The NSCL 430 transmits an authorization request message to the NA 420 that is a detected resource owner. Parameters that may be included in the authorization request message have been described in STEP 03 of FIG. 3 and thus will not be described herein.

STEP 04 is a client verification step S540. Being the resource owner, the NA 420 verifies the client in regard to the authorization request message. To verify the client, the resource owner may request client verification to the MAS 440, or the resource owner may request client verification to an M2M service provider (NSCL) and the M2M service provider may verify the client according to an access authorization policy of the M2M service provider. For example, the method for requesting verification of the EUA 410 to the MAS 440 may include requesting verification of the EUA 410 to the MAS 440 through the NSCL 430 by the NA 420 being the resource owner, determining whether the EUA 410 has been normally registered to the MAS 440 based on client credentials by the MAS 440, and transmitting a client verification response message to the NA 420 based on the determination result through the NSCL 430 by the MAS 440. The verification request message may include parameters such as the client credentials (Client_ID and Client_Secret) and the client verification response message may include the client credentials and certificates.

STEP 05 is an authorization grant step S550. Upon successful completion of the client authentication, the resource owner NA 420 requests the resource server D/G 450 to set up access right for the client EUA 410 so that the client EUA 410 can access to the protected resource. The D/G 450 generates an access right resource associated with the protected resource upon request of the NA 420. Alternatively, if the access right resource associated with the protected resource already exists, the D/G 450 updates the attribute of the access right resource. The access right resource is a resource in which information used to control access to the protected resource is stored, that is, information indicating an allowed entity and what the allowed entity is allowed to do with the protected resource. The NA 420 transmits an authorization grant message to the authorization server MAS 440 through the NSCL 430 to inform the MAS 440 that authorization for EUA 410 has been granted. Parameters that may be included in the authorization request message and the authorization grant message have been described in STEP 05 of FIG. 3 and thus will not be described herein.

STEP 06 is an authorization code issuance and access token request step S560, which is an optional step. The MAS 440 generates an authorization code and issues the authorization code to the EUA 410, as evidence that the authorization request of the EUA 410 has been accepted. The EUA 410 requests to issue an access token required to access to information contained in the protected resource to the MAS 440, with presenting the authorization code. Parameters that may be included in the access token request message have been described in STEP 06 of FIG. 3 and thus will not be described herein.

STEP 07 is an access token issuance step S570. The MAS 440 validates the authorization code presented by the EUA 410. If the authorization code is valid, the MAS 440 generates an access token, delivers the access token to the NCSL 430 so as to associate the access right resource with the access token, and issues the generated access token to the EUA 510, along with an allowed access scope. Depending on embodiments, the NCSL 430 may operate in place of the MAS 440 to transmit its received access token to the EUA 410, along with an allowed access scope. If STEP 06 is omitted, the MAS 440 generates the access token upon receiving the access authorization message from the resource owner in STEP 05, without checking the authorization code. The NCSL 430 manages the received access token by mapping the access token to the access right resource. The MAS 440 may issue a refresh token along with the access token in order to update the access token. Parameters that may be included in a message carrying the access token have been described in STEP 07 of FIG. 3 and thus will not be described herein.

STEP 08 is an access step S580 to a protected resource. Based on the access token, the EUA 410 accesses the resource located in the NSCL 430 to query information. The NSCL 430 validates the access token received from EUA 410 by comparing with the access token received from the MAS 440, checks the access right resource, and allows the EUA 410 to access to the protected resource within the authorization scope matching the access token.

FIG. 6 is a flowchart of an operation for establishing an authorization to access resource, when a client requests a resource owner D/G2 for an access authorization request.

As for the relationships between the respective entities in FIG. 6, the End-User Application (EUA) 410 is independent of the M2M service provider domain, and the EUA 410 corresponds to the client and the D/G 450 to the resource owner.

STEP 01 (S610), STEP 02 (S620), STEP 06 (S660), STEP 07 (S670) and STEP 08 (S680) are performed in the same manner as their counterparts in FIG. 5. Accordingly, a description of the above steps is not provided herein and the following description focuses on STEP 03, STEP 04 and STEP 05.

STEP 03 is an authorization request step S630. The EUA 410 requests an authorization to the NSCL 430. NCSL 430 searches or discovers the resource owner who corresponds to Resource_URI at an SCL or application resource level. As aforementioned with reference to FIG. 3, NSCL 430 may acquire, from an attribute of a container resource or a location container resource, information about a resource owner having protected resource which the client attempts to access. NSCL 450 transmits an authorization request message to D/G 450 that is the discovered resource owner. Parameters in the authorization request message have been described in STEP 03 of FIG. 3 and thus will not be described herein.

STEP 04 is a client verification step S640. The D/G 450 verifies the client in regard to the authorization request message. To verify the client, the resource owner may request client verification to MAS 440, or the resource owner may request client verification to an M2M service provider (NSCL) and the M2M service provider may verify the client according to an access authorization policy of the M2M service provider. For example, the method for requesting verification of EUA 410 to MAS 440 may include requesting by the resource owner D/G 450 for the verification of the client to MAS 440 to which EUA 410 has been registered through the NCSL 430, performing the verification by MAS 440 determining whether EUA 410 has been rightfully registered to MAS 440 based on client credentials, and transmitting a client verification response message through NCSL 430 to the D/G 450 based on the performing of the verification. The verification request message may include parameters such as the client credentials (Client_ID and Client_Secret) and the client verification response message may include the client credentials and certificates.

STEP 05 is an authorization grant step S650. Upon successful completion of the client authentication, D/G 450 requests the NSCL 430 to establish an access right resource so that EUA 410 can access the relevant resource. In response to the request from D/G 450, NSCL 430 generates the access right resource for the relevant resource. Alternatively, if the access right resource associated with the relevant resource already exists, NSCL 430 updates the attribute of the access right resource. The access right resource is adapted to store information on the access right with respect to the protected resource, that is, information on which entity can do which action to the protected resource. D/G 450 transmits an authorization grant message to MAS 440 through NSCL 430 to inform that authorization for EUA 410 has been granted. Parameters in the access right establishment request message and the authorization grant message have been described in STEP 05 of FIG. 3 and thus will not be described herein.

Figure 7:
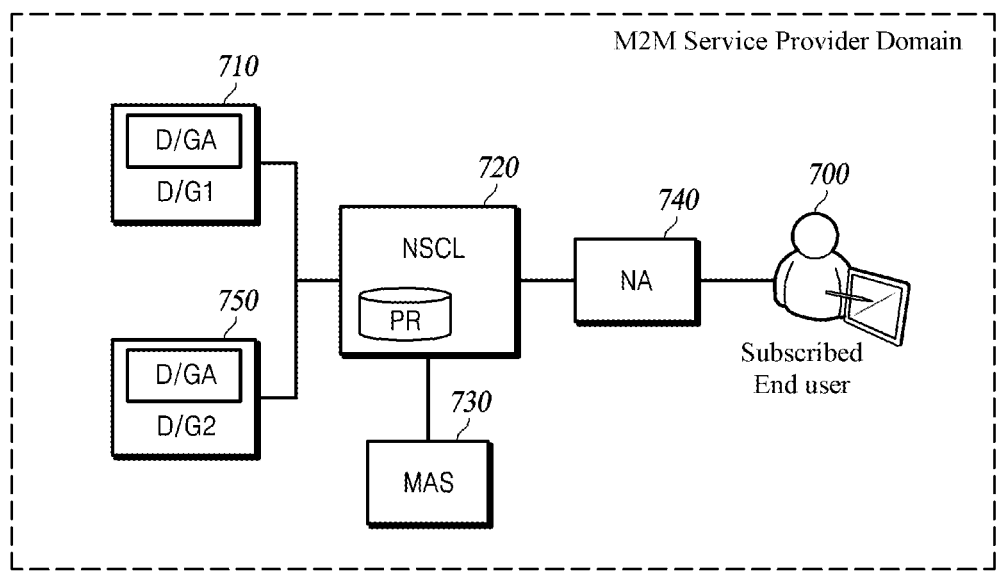
FIG. 7 is a schematic block diagram showing a relationship between M2M service entities, when a client and a resource owner belong to the same M2M service provider domain.
Figure 8:
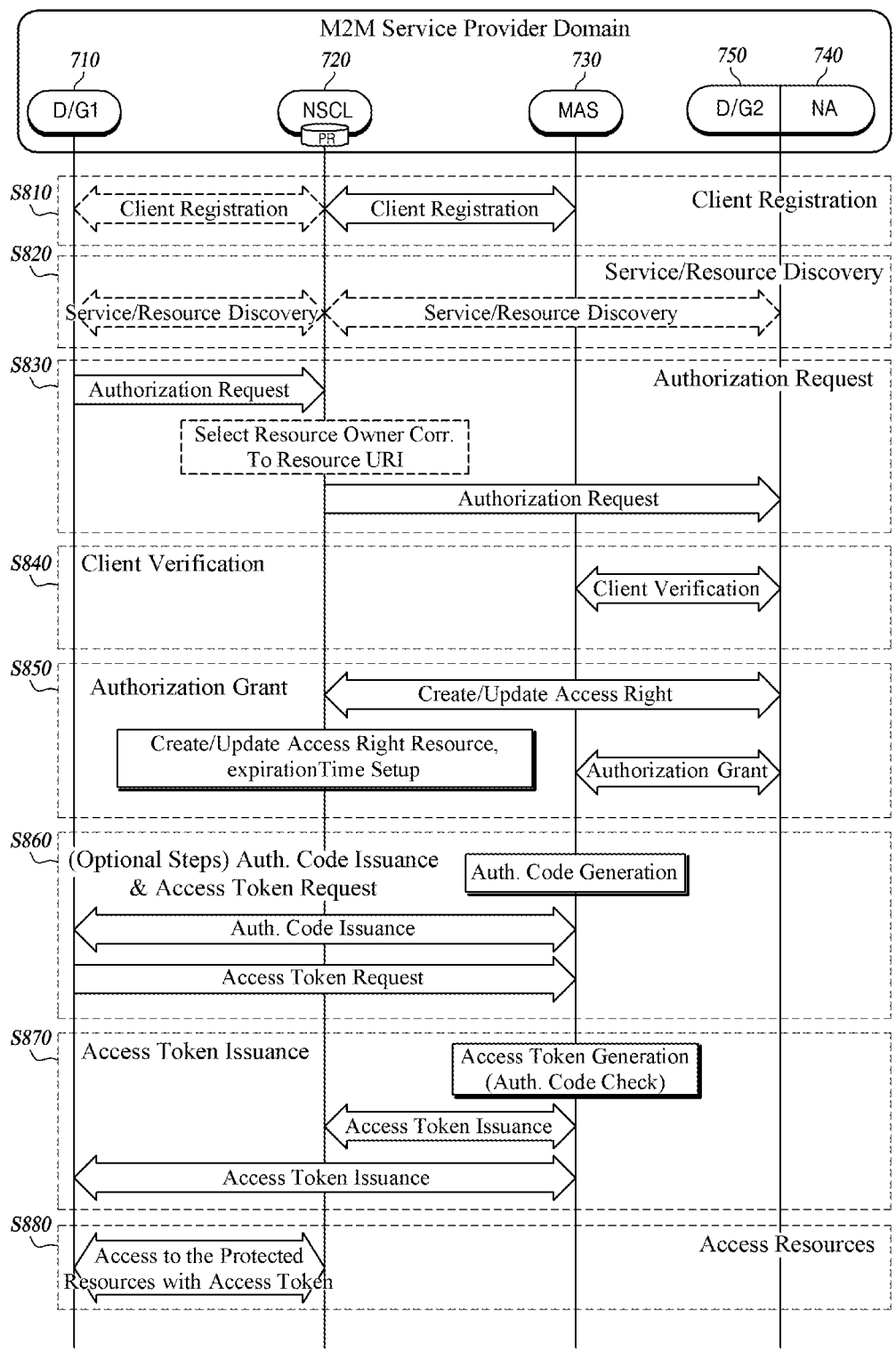
FIG. 8 is a flowchart of an operation for establishing an authorization to access resource among entities in the same M2M service provider domain.

With reference to FIGS. 7 and 8, a method for establishing an authorization to access resource when a client and a resource owner belong to the same M2M service provider domain will be described below.

FIG. 7 is a schematic block diagram showing a relationship between M2M service entities, when a client and a resource owner belong to the same M2M service provider domain.

FIG. 7 is based on the assumption that an end user 700 or a single D/G 710 belonging and subscribing to the same M2M service provider domain attempts to access a resource which stores information generated or collected by another D/G 750.

There is a need for differentiating authorizations of end users subscribed to the same M2M service provider to access resource in which a D/G of the same M2M service provider stores generated or collected information. When a D/G attempts to access resource in which another D/G in the same M2M service provider domain stores generated or collected information, the D/G needs to obtain an authorization to access the resource.

FIG. 8 is a flowchart of an operation for establishing an authorization to access resource among entities in the same M2M service provider domain.

In regard to the relationship between entities in FIG. 8, D/G1 710 and D/G2 750 are in the same M2M service provider domain. A D/G1 710 is a client, and an D/G2 750 or an NA 740 is a resource owner. The resource that the client attempts to access is located in a NSCL 720. The entity, which determines whether to allow the D/G1 710 to access the resource located in the NSCL 710 or not and the scope of the access, may be the D/G2 750 having generated or collected the information which the corresponding resource retains or the entity may be the NA 740 in the M2M server.

While D/G1 710 is described as a client in FIG. 8 and the following description, it should be understood that the same authorization establishment mechanism is applicable when the client is an end user 700.

The procedure of FIG. 8 is similar to the procedure of FIG. 3 except that a client and a resource owner are located in the same M2M service provider domain.

Step 00 is pre-procedures conforming to the ETSI M2M standard. In the pre-procedures, the client completes an M2M service bootstrap procedure, an M2M service connection procedure and an SCL registration procedure. In addition, a relationship between D/G1 710 and a D/GSCL may be based on the premise that D/G1 710 performs a procedure for registering a DA and GA1.

STEP 01 is a client registration step S810. D/G1 710 is allocated client credentials (Client_ID and Client_Secret) by performing a client registration procedure with an NSCL 720. Upon receipt of a client registration message from D/G1 710, the NSCL 720 transmits a client registration message to a MAS 730. Upon receipt of the client registration message, the MAS 730 generates Client_ID and Client_Secret for D/G1 710 and allocates Client_ID and Client_Secret to D/G1 710 through the NSCL 720. Client_ID and Client_Secret are generated in the same manner as in STEP 01 of FIG. 3 and thus a description of generation of Client_ID and Client_Secret will not be provided herein.

STEP 02 is a service/resource discovery step S820. For the client to initiate an authorization procedure, a procedure for providing a service requested by the client or discovering a resource owner having resource information is needed. The client acquires information (ID or URI) about the resource owner and determines the location of a resource server (NSCL) in which the resource are is located by the service/resource discovery step. For this purpose, in one embodiment, the client acquires information about the location (ID or URI) of the resource owner and the location of a resource server (D/GSCL) resource through the NSCL 720 belong to the M2M service domain where the resource are located. For example, the service/resource discovery step S820 may include transmitting a discovery message including discovery filter criteria such as the type of desired information to the NSCL 720 by D/G1 710, and searching for a Resource_URI list matching the discovery filter criterion and transmitting a search result to D/G1 710 by the NSCL 720. In the service/resource discovery step S820, the resource owners, D/G2 750 and NA 740 may indicate at least one of its URI and Resource_URI to the client, D/G1 710. If the client has prior knowledge of the resource owner or Resource_URI or if the locations of the resource owner and the resource are preset, the above service/resource discovery step S820 may be omitted. In other words, the client may acquire the Resource_URI information before an authorization request step S830. The Resource_URI information may be acquired in the service/resource discovery step S820 or received in advance from the resource owner according to a service provider's setting or policy or in any other procedure.

STEP 03 is the authorization request step S830. In the authorization request step S830, the client requests the resource owner for an authorization request. D/G1 710 transmits an authorization request message to the NSCL 720. The NCSL 720 searches or discovers the resource owner who corresponds to Resource_URI at an SCL or application resource level. The NSCL2 720 may acquire, from an attribute of a container resource or a location container resource, information about a resource owner having protected resource which the client attempts to access, as described before with reference to FIG. 3. The NSCL 720 transmits an authorization request message to the discovered resource owner. Parameters that may be included in the authorization request message may be identical to those described in STEP 03 of FIG. 3 and thus will not be described herein.

STEP 04 is a client verification step S840. The resource owner verifies the client in regard to the authorization request message. To verify the client, the resource owner may request client verification to the MAS 730, an end user connected to the resource owner may verify the client, or the resource owner may request client verification to an M2M service provider (the NSCL/NA 720/740) and the M2M service provider may verify the client according to an access authorization policy of the M2M service provider. For example, the method for requesting client verification to the MAS 830 may include requesting by the resource owner for a verification of the client to the MAS 730 to which D/G1 710 has been registered, performing the verification by the MAS 730 determining whether D/G1 710 has been rightfully registered to MAS 730 based on client credentials, and transmitting a client verification response message to the resource owner based on the performed result of the verification. The verification request message may include parameters such as the client credentials (Client_ID and Client_Secret), and the client verification response message may include the client credentials and certificates.

STEP 05 is an authorization grant step S850. Upon successful completion of the client authentication, the resource owner requests to set up an access right for the D/G1 710 to the relevant resource. The NSCL 720 generates an access right resource associated with the relevant resource upon request of the resource owner. Alternatively, if the access right resource associated with the protected resource already exists, the NSCL 720 updates the attribute of the access right resource. The attribute of the access right resource may include an expiration time, and the NSCL 720 may set an expiration time in the authorization of D/G1 710. The resource owner transmits an authorization grant message through the NSCL 720 to the authorization server MAS 730 to inform the MAS 730 that authorization for D/G1 710 has been granted. Parameters and information that may be included in the authorization request message and the authorization grant message may be identical to those described in STEP 03 of FIG. 3 and thus will not be described herein.

STEP 06 is an authorization code issuance and access token request step S860, which is an optional step. The MAS 730 generates and issues an authorization code to the D/G1 710, as evidence that the authorization request of the D/G1 710 has been granted. The D/G1 710 requests the MAS 730 to issue an access token required to query the resource information, by using the issued authorization code. Parameters that may be included in an access token request message may be identical to those described in STEP 06 of FIG. 3 and thus will not be described herein.

STEP 07 is an access token issuance step S870. The MAS 730 validates the authorization code presented by D/G1 710. If the authorization code is valid, the MAS 730 generates and delivers an access token to NSCL 720 and issues the access token to D/G1 710, along with an allowed access scope. Depending on embodiments, the NCSL 720 may operate in place of the MAS 730 to transmit its received access token to the D/G1 710, along with an allowed access scope. If STEP 06 is omitted, the MAS 730 generates the access token upon receiving the access authorization message from the resource owner in STEP 05, without checking the authorization code. NSCL 720 manages the received access token by mapping the received access token to the access right resource. The MAS 730 may issue a refresh token along with the access token in order to update the access token. Parameters that may be included in the access token request message may be identical to those described in STEP 07 of FIG. 3 and thus will not be described herein.

STEP 08 is an access step S880 to a protected resource. Based on the access token, D/G1 710 accesses the resource located in the NSCL 720 to query information. The NSCL 720 validates the access token received from D/G1 710 by comparing with the access token received by the NSCL 720 from the MAS 730, checks the access right resource, and allows D/G1 710 to access to the protected resource within an authorization scope matching the corresponding access token.

Although the steps of each of FIGS. 3, 5, 6 and 8 have been described as being sequentially performed, this is only an exemplary description of the technical idea of at least one embodiment of the present disclosure. Those skilled in the art will appreciate that various modifications, additions and substitutions are possible, without departing from the characteristics of at least one embodiment of the disclosure. For example, the order of steps shown in each of FIGS. 3, 5, 6 and 8 may be changed, or one or more of the steps may be performed in parallel. Therefore, the present disclosure is not limited to the time-series order as shown in FIGS. 3, 5, 6 and 8.

Although exemplary embodiments of the present disclosure have been described for illustrative purposes, those skilled in the art will appreciate that various modifications, additions and substitutions are possible, without departing from the essential characteristics of the disclosure. Therefore, exemplary embodiments of the present disclosure have been described for the sake of brevity and clarity. Accordingly, one of ordinary skill would understand the scope of the disclosure is not limited by the explicitly described above embodiments but by the claims and equivalents thereof.

CROSS-REFERENCE TO RELATED APPLICATION

If applicable, this application claims priority under 35 U.S.C §119(a) of Patent Application No. 10-2012-0057165, filed on May 30, 2012 in Korea, the entire content of which is incorporated herein by reference. In addition, this non-provisional application claims priority in countries, other than the U.S., with the same reason based on the Korean patent application, the entire content of which is hereby incorporated by reference.

The invention claimed is:

1. A method for establishing an authorization to access resource in Machine-to-Machine (M2M) communication, when entity selected from a terminal, a gateway and an end user as a client in an M2M service provider domain attempts to access resource located in a service layer of an M2M server for providing an M2M service in the same M2M service provider domain, the method comprising:

receiving by the client a client credential allocated from an authentication server for providing an authentication service which is required in the M2M service provider domain by performing a client registration to the service layer by the client;

requesting by the client an authorization to access the resource to a resource owner of the resource based on information about a Resource_URI of the resource;

verifying, by the resource owner, the client through the authentication server;

granting, by the resource owner, the authentication server the authorization for the client to access the resource;

issuing an access token to the client by the authentication server; and accessing, by a processor of the client, the resource based on the issued access token.

2. The method of claim 1, further comprising:
issuing an authorization code to the client by the authentication server; and requesting an access token to the authentication server by using the issued authorization code by the client.

3. The method of claim 1, further comprising acquiring, by the client, the information about the URI of the resource through the service layer.

4. The method of claim 1 wherein the authentication server is an Authentication, Authorization, and Accounting (AAA) server, or a server providing an AAA service in a third M2M service provider domain.

5. The method of claim 1, wherein a lifetime is set for the access token.

\* \* \* \* \*